United States Patent Office.

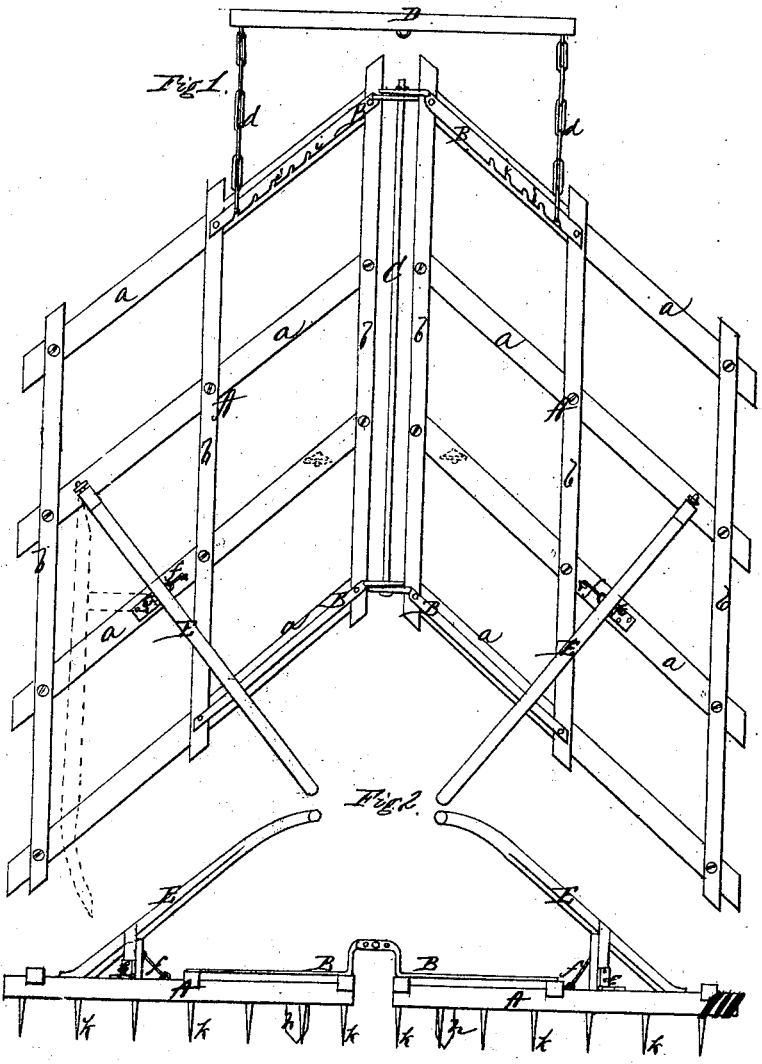

JOHN MAXTON, OF SEYBROOK, ILLINOIS.

Letters Patent No. 111,857, dated February 14, 1871.

IMPROVEMENT IN COMBINED CULTIVATORS AND HARROWS.

The Schedule referred to in these Letters Patent and making part of the same.

*To all whom it may concern:*

Be it known that I, JOHN MAXTON of Seybrook, in the county of McLean and in the State of Illinois, have invented certain new and useful Improvements in Combined Corn-Cultivator and Harrow; and do hereby declare that the following is a full, clear, and exact description thereof, reference being had to the accompanying drawing and to the letters of reference marked thereon making a part of this specification.

The nature of my invention consists in the construction and arrangement of a "combined corn-cultivator and harrow," as will be hereinafter fully set forth.

In order to enable others skilled in the art to which my invention appertains to make and use the same, I will now proceed to describe its construction and operation, referring to the annexed drawing, in which—

Figure 1 is a plan view, and

Figure 2, a rear view of my improved corn-cultivator and harrow.

This implement consists of two distinct and separate beveled harrows A A, each half consisting of four cross-pieces $a\ a$, of wood, gained into three other pieces, $b\ b$, which rest on top of the first, and held firmly together by twelve bolts in each section.

The hinges B B couple the harrows together in such a manner as to allow of adjusting the implement when so connected as to bring the two sections A A together, and also to spread the same at pleasure to any width necessary for the successful cultivation of the growing plants.

The adjustable hinges B B also extend back to the middle of each section, (or thereabout,) they having oblong creases or notches $i\ i$ cut therein to receive the chains $d\ d$, by which the implement is pulled.

The rod C connects the hinges together, which may at one end be provided with a nut with a small hand-stem attached, which can be removed and altered at pleasure.

The chains $d\ d$, hooked in the notches $i\ i$ on the prolongation of the hinges B B, are, at their front ends, attached to the stretcher or evener D, which has two hooks to receive the ends of said chains, and is also adapted to receive a clevis and double-tree, so as to secure to the implement a center draft.

The handles E E are hinged to the sections A A by hinges $e\ e$, by which they can be raised or lowered at pleasure. They are kept while at work in their places by the two hooks $f\ f$.

The whole implement can be folded together at pleasure by unhooking the hooks $f\ f$ from their fastenings, and laying the handles down on the respective frames.

$h\ h$ represent two shovels, fastened to either the second or third lower cross-piece $a$ by nuts, with a small stem attached or otherwise; these shovels to be inserted in the place of the harrow-teeth $k\ k$ which they replace, or *vice versa*.

The component parts of the above implement to be made of a size and of material suitable to the work which it is designed to do.

Having thus fully described my invention,

What I claim as new, and desire to secure by Letters Patent, is—

The arrangement of the harrow-sections A A, with teeth $k\ k$ and shovels $h\ h$, connected together by the rod C and hinges B B, the front hinges having notches $i\ i$ to which the chains $d\ d$ and evener D are secured, and provided with the hinged handles E E, all as shown and described.

In testimony that I claim the foregoing I have hereunto set my hand this 25th day of July, 1870.

JOHN MAXTON.

Witnesses:
THOS. SLADE,
JOSIAH DRUMMOND HARBERT.